C. L. AND M. C. ROGERS AND W. W. BROWN.
COOLING OR REFRIGERATING APPARATUS.
APPLICATION FILED SEPT. 18, 1919.

1,414,209.

Patented Apr. 25, 1922
6 SHEETS—SHEET 1.

Inventors
Charles Leon Rogers
Manley Chapman Rogers
Willard W. Brown
by Roberts, Roberts & Cushman
their Attorneys C. L. AND M. C. ROGERS AND W. W. BROWN.
COOLING OR REFRIGERATING APPARATUS.
APPLICATION FILED SEPT. 18, 1919.
1,414,209.
Patented Apr. 25, 1922.
6 SHEETS—SHEET 2.
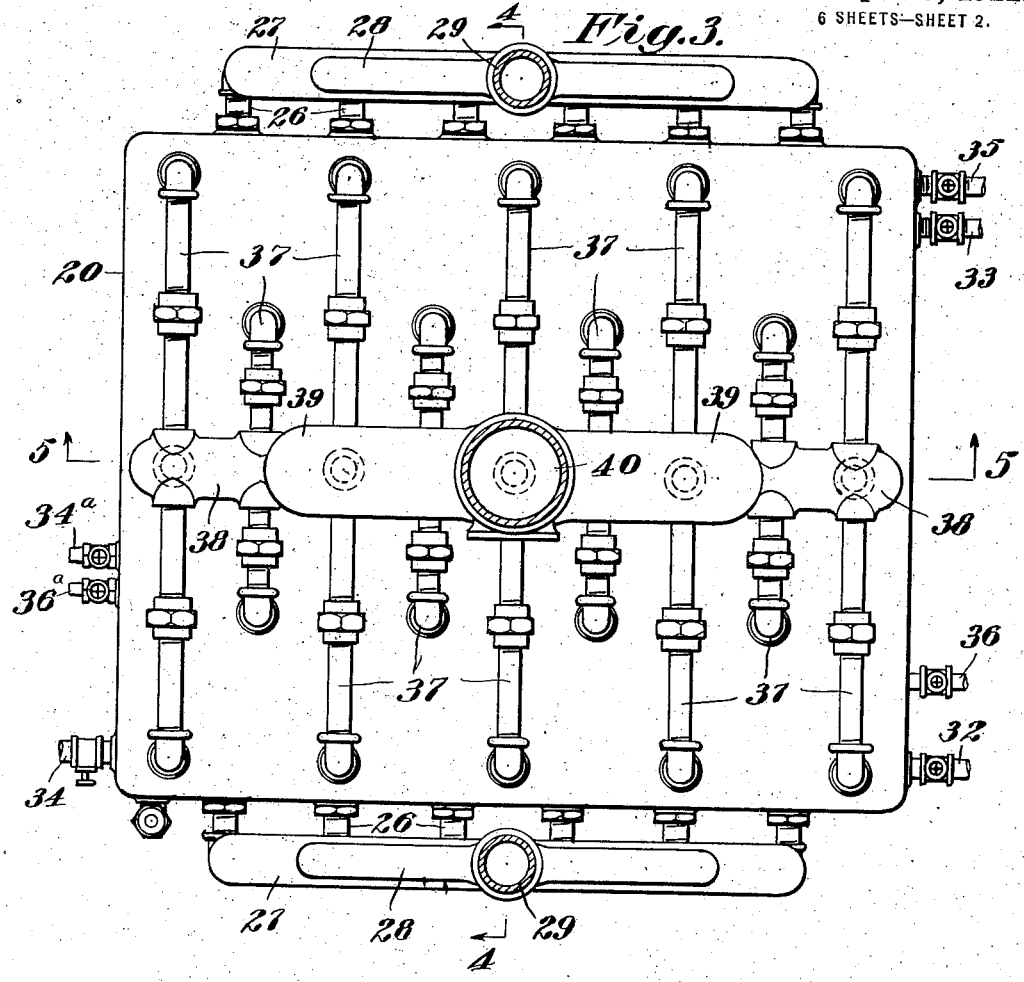
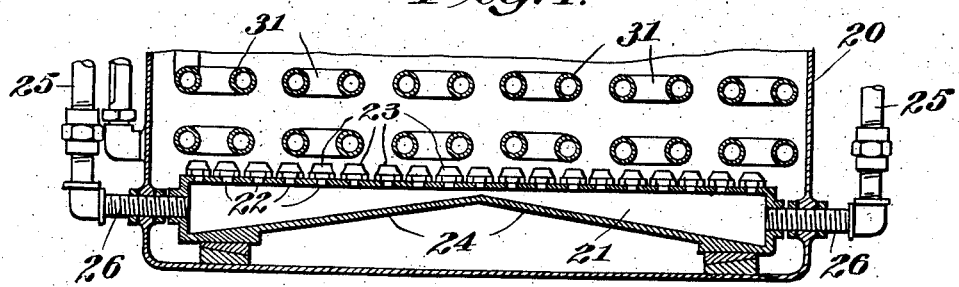

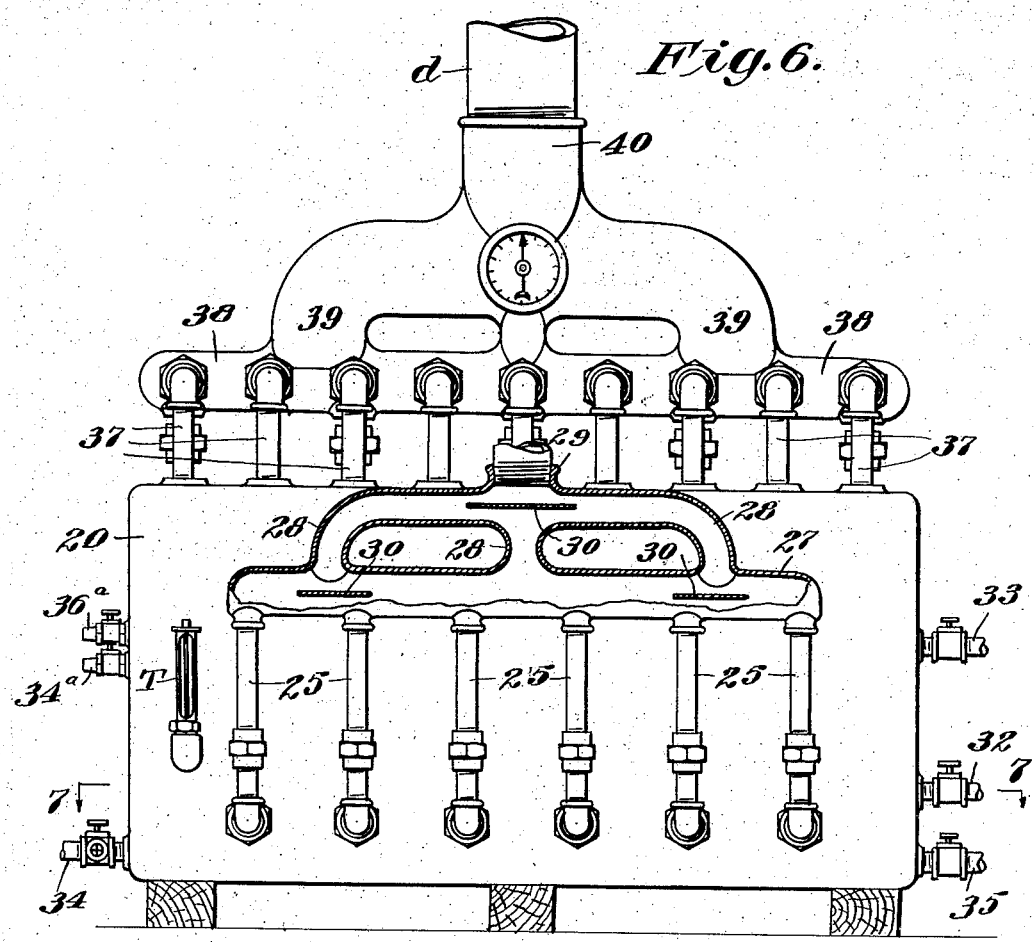
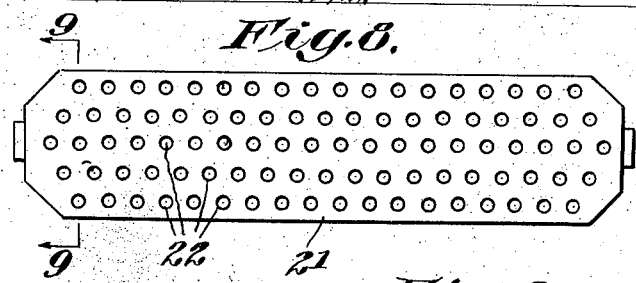
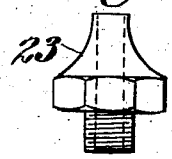
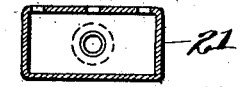

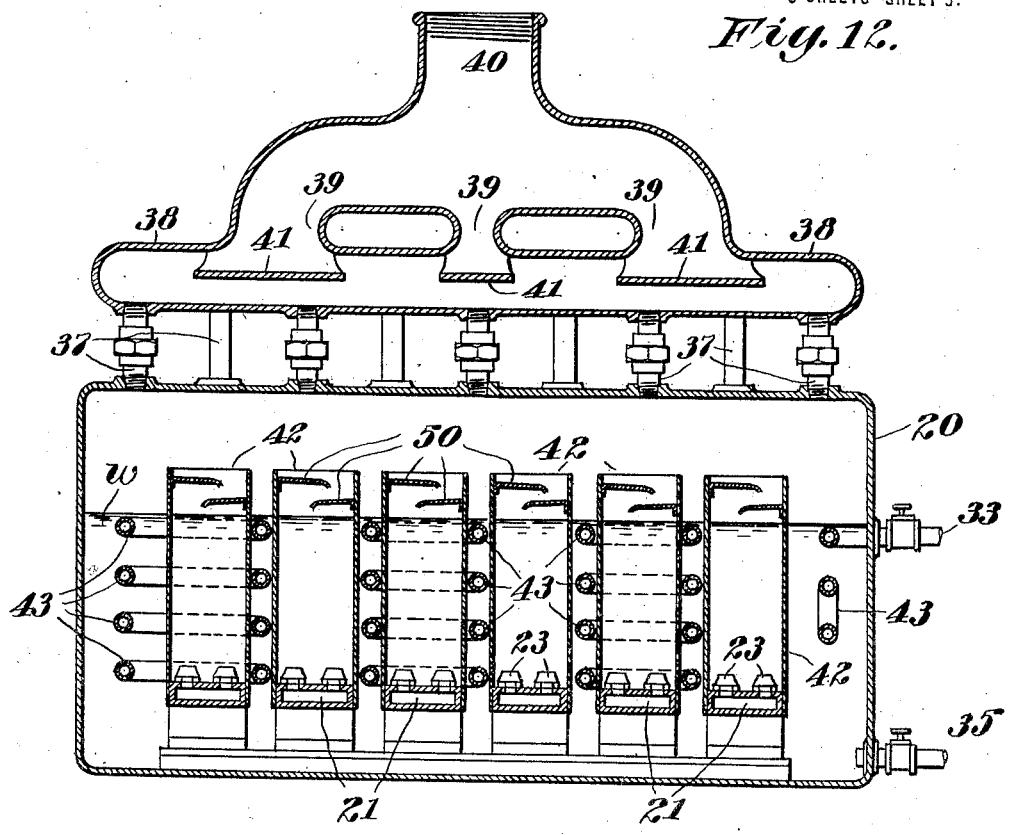
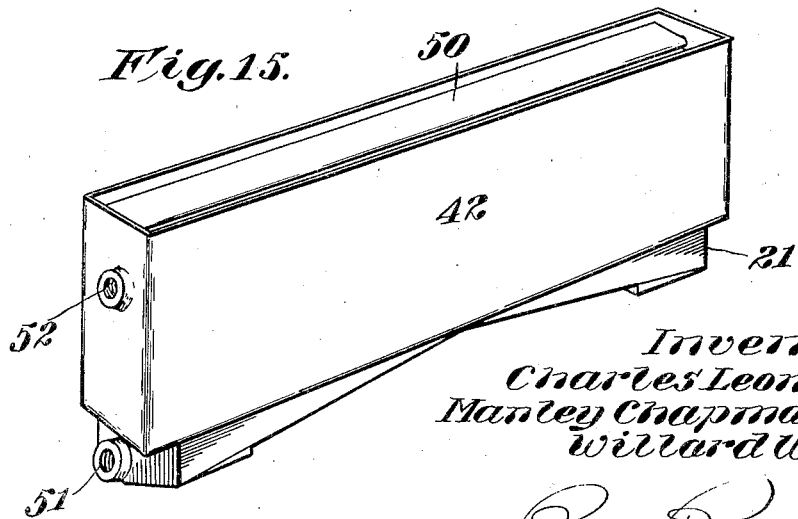

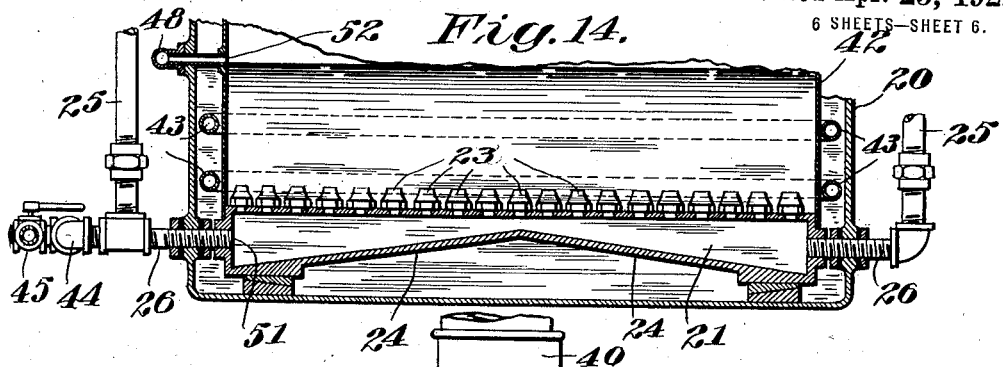
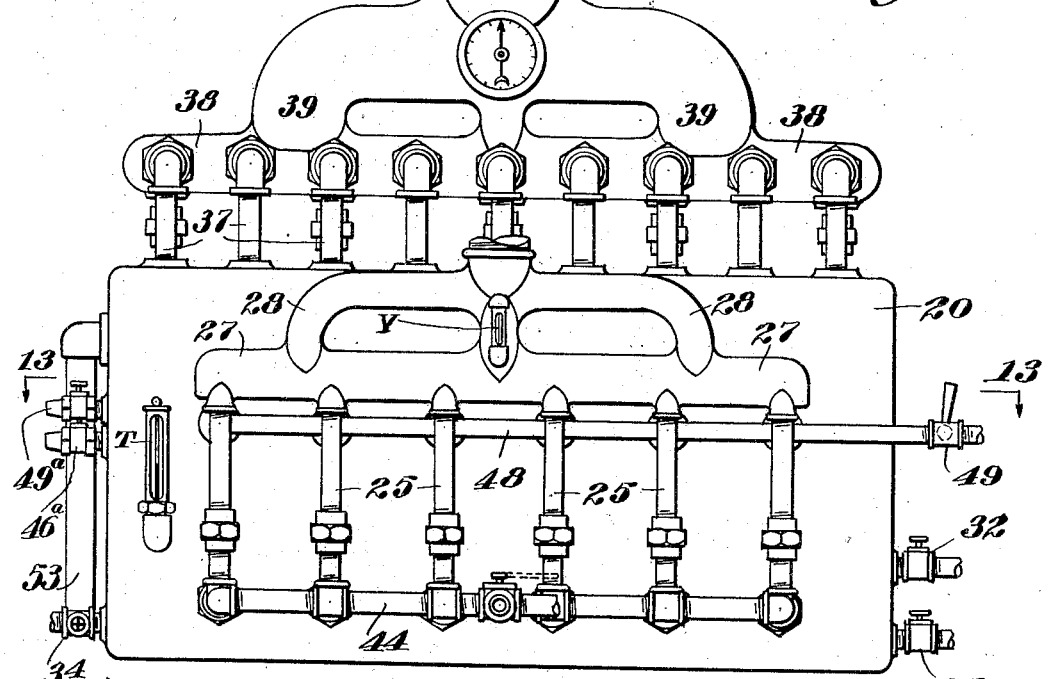
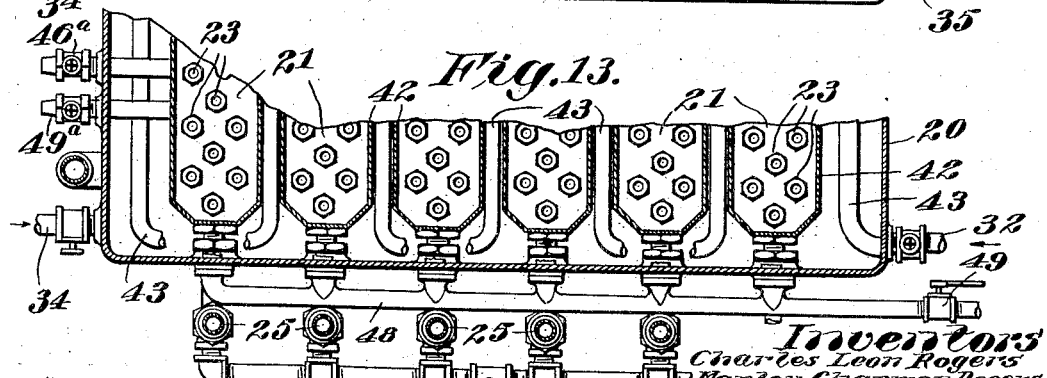

UNITED STATES PATENT OFFICE.

CHARLES LEON ROGERS AND MANLY CHAPMAN ROGERS, OF WEEHAWKEN, NEW JERSEY, AND WILLARD W. BROWN, OF CHESTERTOWN, NEW YORK.

COOLING OR REFRIGERATING APPARATUS.

1,414,209. Specification of Letters Patent. Patented Apr. 25, 1922.

Application filed September 18, 1919. Serial No. 324,300.

*To all whom it may concern:*

Be it known that we, CHARLES LEON ROGERS and MANLY CHAPMAN ROGERS, both of Weehawken, in the county of Hudson and State of New Jersey, and WILLARD W. BROWN, of Chestertown, in the county of Warren and State of New York, citizens of the United States, have invented new and useful Improvements in Cooling or Refrigerating Apparatus, of which the following is a specification.

This invention relates to improvements in cooling and ventilating apparatus adapted to be installed in buildings so that a constant supply of cool air particularly in the summer may be supplied to the rooms economically and efficiently. The invention is also applicable to refrigerating plants for the cold storage of provisions and other articles.

One of the objects of the invention is to provide a cooling and ventilating apparatus, which may be readily connected to the heating apparatus employed in the winter and thus utilize the pipes of the heating apparatus for conveying cooled, cleaned and purified air to the various rooms of a building. Another object is to provide a cooling and ventilating apparatus employing a method of projecting and diffusing through the refrigerated fluid in the cooling tank a large number of relatively small streams of air. This is an important feature and improvement, since by this method air is more widely and equally diffused throughout the refrigerated fluid and hence more uniformly cooled than in apparatus employing different methods, while at the same time the air is more efficiently cleaned and thereby particles of dust or other foreign matter are more readily removed.

Another object is to provide means for equalizing the distribution of the air to the refrigerated fluid, as well as to the outlet of the cooling tank.

Another object is to provide in each room one or more air delivery terminals provided with means for diffusing and distributing the cooled air laterally in all directions, so as to thereby insure a general distribution of cooled air throughout the room. Thermostatic means may be provided if desired, for automatically closing a control valve when the temperature of the room falls to a predetermined degree, and again opening the valve when the temperature rises to a predetermined degree.

Another object is to provide means, comprising baffle plates, in the cooling tank adjacent to the outlet, to prevent the passage of spray or moisture, as well as to equalize the distribution of the air from the tank to the outlet.

Another object is to provide a layer of oil on the surface of the refrigerated water or brine in the cooling tank so as to reduce the humidity of the cooled air as it passes into the space above the water, brine or other suitable refrigerating fluid in the tank and thence toward the outlet. The quantity of moisture so taken out of the air may be varied by the amount of oil used.

Another object is to provide means for supplying air to the cooling tank from the different rooms of a building, thus using the air over again and returning it to the rooms in a cool and purified condition, or if so desired, the air may be supplied directly from the outside atmosphere.

In the accompanying drawings which illustrate certain embodiments of the invention—

Fig. 3 is a plan view of one form of air cooling or refrigerating apparatus;

Fig. 4 is a fragmentary section on line 4—4 of Fig. 3;

Fig. 6 is a side elevation of the apparatus, partly in section;

Fig. 8 is a plan view of one of the air distributors;

Fig. 9 is a section on line 9—9 of Fig. 8;

Fig. 10 is an enlarged side elevation of one of the distributor nozzles;

Fig. 11 is a side elevation of another form of air cooling or refrigerating apparatus containing individual cooling tanks;

Fig. 12 is a central vertical section of the apparatus shown in Fig. 11;

Fig. 13 is a fragmentary section on line 13—13 of Fig. 11;

Fig. 14 is a fragmentary section taken lengthwise of one of the individual cooling tanks; and Fig. 15 is a perspective view of one of said individual tanks.

Figure 1:
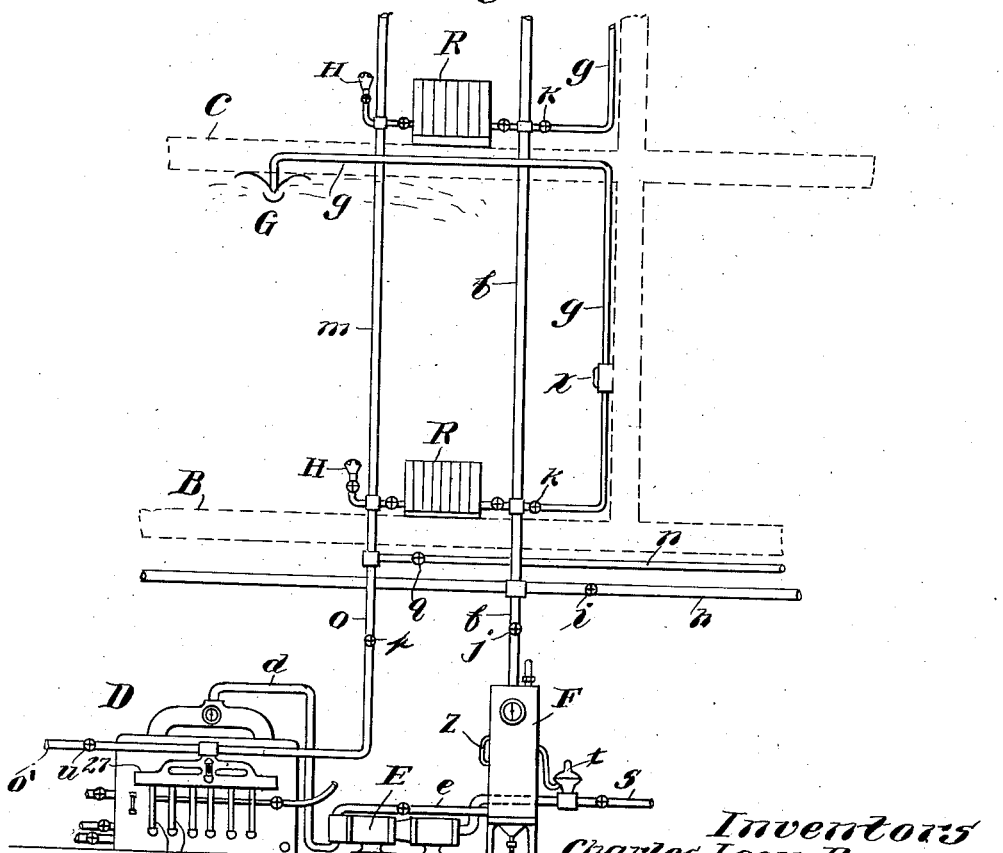
Fig. 1 is a diagrammatic view in vertical section showing the apparatus installed in a building.

Referring first to Fig. 1 which illustrates an installation as a whole, A, B, and C represent respectively the basement floor and two upper floors of a building. The air after being chilled in the air cooling or refrigerating apparatus D, which is preferably located in the basement, is drawn through pipe $d$ by exhaust pump E, and thence delivered through pipe $e$ to a reservoir F. It will be understood that if preferred, the air may be forced through the cooling apparatus by a pressure pump instead of by an exhaust pump. From reservoir F the air passes upward through pipe $f$ from which it is distributed to the several apartments or chambers to be cooled. For example, on the first floor B, a branch pipe $g$ leads from pipe $f$ to a delivery terminal G, which is preferably located on the ceiling or at some other high point in the room, from which the cold air having a tendency to settle will be distributed throughout the room.

Figure 2:
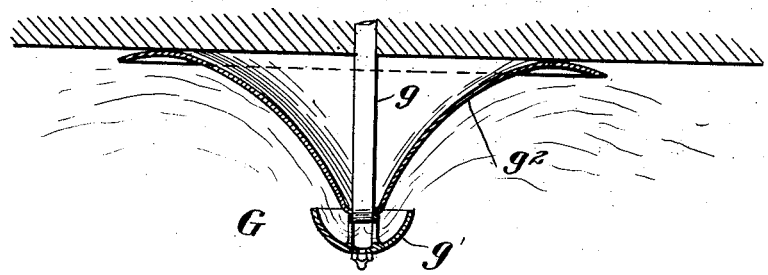
Fig. 2 is an enlarged section of one of the air delivery terminals.

The delivery terminal G as herein shown comprises a cup-like member $g'$ (Fig. 2) secured to the end of the pipe $g$ and adapted to deflect the air issuing from pipe $g$ upward, and a canopy $g^2$ surrounding the delivery end of pipe $g$ and adapted to deflect the air from cup $g'$ laterally in all directions, thus insuring a general distribution of the cold air throughout the room. It will be understood that this is but one of many forms of delivery terminals suitable for our purpose. A similar delivery pipe $g$ and terminal may be provided for each chamber to be cooled.

The pipe $f$ may be the steam riser pipe of any ordinary steam heating system. The steam supply pipe is indicated at $h$ and when the air cooling apparatus is in operation the steam pipe $h$ will be cut off by valve $i$. Similarly when the steam heating system is in operation the cold air connections will be cut off by the valve $j$ controlling pipe $f$ and valves $k$, controlling pipes $g$.

R, R, represent ordinary steam radiators, controlled at both ends by valves as usual, and $m$ represents the return pipe, connected to the usual return steam pipe $n$ of the steam heating system, and to the return branch $o$ of the cooling apparatus leading to the intake of the cooling or refrigerating apparatus D. Valves $p$ and $q$ control respectively the return air pipe $o$ and the return steam pipe $n$.

H, H, represent air receiving funnels of any approved design, connected to the return pipe $m$ in the several chambers to be cooled.

Thus the air, cooled in cooling apparatus D, is delivered by pump E into reservoir F and thence through pipes $f$ and $g$ to the chamber or chambers to be cooled. The air is supplied to cooler D from the several chambers through funnels H and return pipe $m$, $o$. If it is not desired to take the air from the chamber and use it over again, the intake of the cooler D may be supplied through pipe $o'$ which communicates with the outside atmosphere. In this case the funnels H, and the pipe $o$ might be omitted. Pipe $o'$ is controlled by valve $u$.

The pump E may be operated by any suitable source of power, as by steam through pipe $s$. The steam supply, and consequently the action of the pump, may be automatically regulated by a governor $t$ of any approved form, which is connected to and controlled by the pressure of air in reservoir F, so that when the pressure in F reaches a predetermined degree the pump will automatically be stopped or slowed down. It will also be advisable to equip the tank F with a safety valve of any suitable type, and with a drain cock $w$ through which water of condensation may be drawn off.

If desired each cold air supply branch $g$ may be provided with a thermostatic control valve $x$ adapted to close when the temperature of the air in the room falls to a predetermined degree, and again to open when the temperature rises to a predetermined degree.

Referring now to the air cooling or refrigerating apparatus shown in Figs. 3 to 10 inclusive; 20 represents a tank or casing, in the bottom of which are a series of hollow air distributor heads 21. Any number of such distributor heads may be used according to the size and capacity of the apparatus. Each distributor head 21 is provided with a large number of relatively small air delivery openings 22 in its top wall, to which are fitted nozzles 23. The size and number of the holes and nozzles will be determined by capacity of the apparatus. The bottom walls 24 of each distributor head incline or converge toward the top wall from each end toward the center thus reducing the capacity from the intake opening at each end toward the center and equalizing the distribution of the air to the several delivery nozzles 23.

Each distributor 21 is supplied with air at each end by a pipe 25 outside of tank 20, connected to the end of the distributor by a pipe fitting 26, which extends through the wall of the tank. All of the air supply pipes 25 on each side of the tank are connected to a common header or suitably constructed manifold 27 into which air passes from pipe $o$ or pipe $o'$. To equalize the distribution of the air to the several pipes 25 the header 27 may have a number of passages or branches 28 (three being shown in the drawings) between the intake 29, connected to the air supply $o$ or $o'$, and the header proper 27. Even distribution of air to header 27 may be further insured by baffles 30 (Fig. 6).

Figure 5:
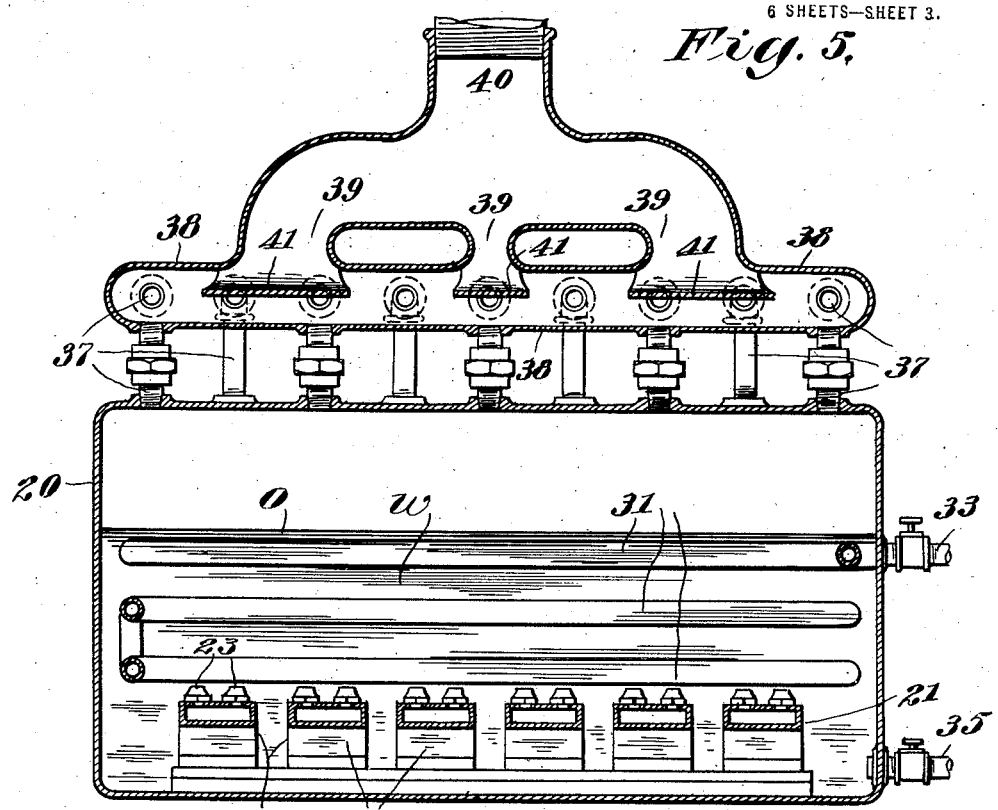
Fig. 5 is a section on line 5—5 of Fig. 3.
Figure 7:
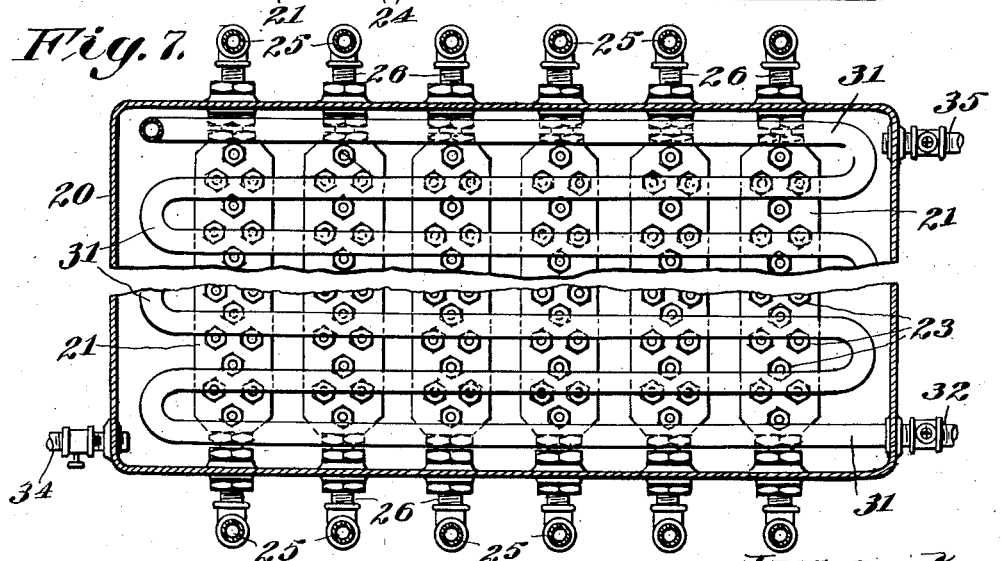
Fig. 7 is a section and plan view, partly broken away, on line 7—7 of Fig. 6.

The tank 20 is partly filled with brine, water or other suitable refrigerating fluid, W (Fig. 5). Coils of refrigerating pipes 31 running through the fluid W maintain the temperature of the fluid at the desired degree and are connected to a circulating system for ammonia or other suitable refrigerating medium by valve controlled pipes 32 and 33. The inlet for the brine or other refrigerating fluid is shown at 34 and the outlet at 35.

A layer of oil O (Fig. 5) is maintained on top of the fluid W, and is introduced into the tank through inlet 36. A brine try cock $34^a$ and an oil try cock $36^a$ serve to indicate when the brine and oil have reached their proper levels.

A series of outlet pipes 37 lead from the top of tank 20 into a common header or manifold 38. The connections of the outlet pipes 37 to the top wall of the tank are so spaced and positioned as to draw air substantially uniformly and equally from all parts of the tank. The header 38 is provided with a number of outlet passages or branches 39 (three being herein shown) leading to a single outlet passage 40 to which the suction pipe $d$ is connected. Baffle plates 41 opposite the passages through pipes 39 prevent the passage of spray or free moisture into the branches 39 and also aid in equalizing the distribution of the air from all parts of the tank to the outlet passage 40.

The operation of the apparatus is as follows: The brine or water W is cooled to the desired temperature by the refrigerating coils 31. The temperature may be determined by a thermometer T (Fig. 6) connected to tank 20 in a well known manner. Exhaust pump E is started and exhausts air from the top of tank 20. As the distributor heads 21 are open to the atmosphere through pipes $o$ or $o'$, header 27 and branches 25, air will enter the tank by reason of the difference in pressure, through distributor nozzles 23, which are disposed substantially uniformly over the lower part of the tank. The incoming air will bubble up and will be diffused uniformly through the cold brine or water W, by which it is cooled on its passage into the air chamber at the top of the tank. The layer of oil O on top of the brine or water W tends to dry or reduce the humidity of the cooled air by preventing spray or free moisture from passing with the air into the space at the top of the tank. From the top of tank 20 the cold air is delivered by the pump into the reservoir F and thence to the several chambers or apartments to be cooled as already described. A thermometer Y (Fig. 11) in the air intake serves to indicate the temperature of the incoming air, while a thermometer Z (Fig. 1) attached to the reservoir F indicates the temperature of the cooled air, and a suitable vacuum gauge is inserted in the air outlet from the cooling tank.

In the modification shown in Figs. 11 to 15 the tank 20, the outlet pipes 37, header 38, branches 39, outlet passage 40, and baffle plates 41, may be the same as in the form of apparatus first described. The distributor heads 21 may also be substantially the same as before, but instead of delivering into a single body of brine or other refrigerating fluid in tank 20, each distributor head 21 delivers into an individual tank or unit 42. A distributor head 21 forms the bottom of each individual tank 42, and the several individual tanks 42 are arranged side by side with spaces between so that the brine W or other refrigerating fluid may circulate around them. By using individual tanks the air may be cooled by passing through pure clean water and oil, which is chilled by the surrounding body of brine or other refrigerating fluid in the main tank.

A refrigerating coil 43, connected with an ammonia or other refrigerating system, extends through the fluid W and around and between the several individual tanks 42.

Water or other refrigerating fluid is delivered to the individual tanks 42 through the distributor heads 21 from a pipe 44, which is connected by branches to one end of each of the distributor heads 21. A three position valve 45 controls supply pipe 46, through which water is supplied to pipe 44 and thence to the individual tanks when valve 45 is open to pipe 46. Valve 45 also controls outlet pipe 47 for emptying the individual tanks; and when the tanks are filled and in operation valve 45 is closed to both pipes 46 and 47.

The inlet pipes to the several individual tanks leading from pipe 44, are also connected by the branches 25 to the head 27 as in the other form of apparatus.

Oil is supplied to the upper part of each individual tank from a pipe 48 controlled by suitable valve 49, while a water try cock $46^a$ and an oil try cock $49^a$ indicate the proper levels reached by the water and oil. Each tank 42 has baffle plates 50 near its top, inclined downward from the walls of the tank to arrest any spray or free moisture which gets past the layer of oil, and allows it to run or drip back into the tank. Each tank 42 has a common air and water inlet 51 and an oil inlet 52. The tank 20 is also provided with a water gauge 53 of any suitable type.

The operation of this form of apparatus is substantially similar to the other. Air entering the bottom of individual tanks 42 from the distributor heads 21 under the influence of atmospheric pressure, bubbles up through the water in said tanks, is chilled thereby and dried by the layer of oil and by the baffle plates 42, and thence is drawn from the top of tank 20 by the exhaust pump and delivered to the chambers to be cooled. The brine or other refrigerating medium in tank 20 is cooled by the refrigerating coil 43, and in turn cools the contents of the individual tanks 42 which it bathes.

We claim:

1. An air cooling apparatus comprising a tank provided with a refrigerated fluid, means for projecting through the said fluid a plurality of relatively small streams of air, and means comprising an imperforate surface for equalizing the distribution of the air to the said refrigerated fluid.

2. An air cooling apparatus comprising a tank provided with means for admitting a refrigerating fluid thereto, means for admitting oil to said tank whereby to provide a layer of oil above the refrigerating fluid contained therein, and means for projecting through the said fluid and oil a plurality of relatively small streams of air.

3. An air cooling apparatus comprising a tank provided with means for admitting a refrigerating fluid thereto, means for admitting oil to said tank whereby to provide a layer of oil above the refrigerating fluid contained therein, and for projecting through the said fluid and oil a plurality of relatively small streams of air, and means for equalizing the distribution of the air to the said refrigerated fluid.

4. A cooling apparatus comprising a tank having a plurality of air outlets distributed over its upper portion and leading to a common discharge passage, means for admitting refrigerating fluid to the tank and exhaust means connected to said discharge passage for drawing the air through the said fluid and distributing it thereby under pressure to the various rooms of a building.

5. A cooling apparatus comprising a tank provided with a refrigerated fluid, and one or more air distributor heads in the bottom of the tank having on their top wall a plurality of relatively small air delivery openings, and an air inlet opening at the end, the interior capacity of the distributor head or heads diminishing progressively in the direction of the flow of the air.

6. A cooling apparatus comprising a tank provided with a refrigerated fluid, and one or more air distributor heads in the bottom of the tank having on their top walls a plurality of relatively small air delivery openings, and air inlets leading into both ends of the air distributor head or heads, the interior capacity of the distributor head or heads diminishing from the ends toward the middle.

7. A cooling apparatus comprising a tank provided with a refrigerated fluid, and one or more air distributor heads in the bottom of the said tank provided on their top walls with a plurality of relatively small air delivery openings and having bottom walls converging toward the top wall.

8. A cooling apparatus comprising a tank provided with a refrigerated fluid, one or more air distributor heads in the bottom of the said tank provided on their top walls with a plurality of relatively small air delivery openings and having bottom walls converging toward the top wall, and air inlets leading into the wider part of said air distributor heads.

9. A cooling apparatus comprising a tank provided with a refrigerated fluid, air distributor heads in the bottom of the said tank provided on their top walls with a plurality of relatively small air delivery openings, a manifold having air inlets leading into the said air distributor heads, and baffle plates adjacent to the said air inlets tending to equalize the distribution of the incoming air to the said air inlets.

10. A cooling apparatus comprising a tank provided with a refrigerated fluid, air distributor heads in the bottom of the said tank provided on their top walls with a plurality of relatively small air delivery openings, air inlets leading into the said air distributor heads, air outlets leading from the top of said tank, and baffle plates adjacent to the air outlets adapted to intercept the passage of moisture and to equalize the distribution of the cooled air thereto.

11. A cooling apparatus comprising a tank provided with a refrigerated fluid, air distributor heads in the bottom of the said tank provided on their top walls with a plurality of relatively small air delivery openings, a manifold having air inlets leading into the said air distributor heads, baffle plates adjacent to the said air inlets tending to equalize the distribution of the incoming air to the said air inlets, air outlets leading from the top of said tank, and baffle plates adjacent to the air outlets adapted to intercept the passage of moisture and to equalize the distribution of the cooled air thereto.

12. A cooling apparatus comprising a tank provided with a refrigerated fluid, air distributor heads in the bottom of the said tank provided on their top walls with a plurality of relatively small air delivery openings, air inlets leading into the said air distributor heads, air outlets from the said cooling tank positioned to draw air substantially uniformly and equally from all parts of the cooling tank, and a delivery manifold into which all of said air outlets discharge.

13. A cooling apparatus comprising a main tank provided with refrigerating means, a plurality of individual subsidiary cooling tanks in the main tank each containing a cooling fluid and an air distributor head in the bottom, an air inlet for each distributor head, and an air outlet from the main tank.

14. A cooling apparatus comprising a main tank provided with a refrigerated fluid, a plurality of individual subsidiary cooling tanks in the main tank surrounded and bathed by said refrigerated fluid, each containing a cooling fluid and an air distributor head in the bottom, an air inlet for each distributor head, and an air outlet from the main tank.

15. A cooling apparatus comprising a main tank provided with a refrigerated fluid, a plurality of individual subsidiary cooling tanks in the main tank surrounded and bathed by said refrigerated fluid, each containing a cooling fluid, baffle plates above the cooling fluid adapted to intercept moisture and an air distributor head in the bottom, an air inlet for each distributor head, and an air outlet from the main tank.

16. A cooling apparatus comprising a tank provided with a refrigerated fluid, means to force air through said tank and fluid, means to convey the cooled air from said tank to a room or rooms of a building for free discharge therein, and means to convey air from said room or rooms back again through said tank and fluid.

17. A cooling apparatus comprising a tank provided with a refrigerated fluid, an exhaust pump adapted to draw air through said tank and fluid, a storage tank to which the exhaust pump delivers, means to convey air from said storage tank to a room or rooms of a building for free discharge therein, and means to convey air from said room or rooms back again through said tank and fluid.

18. The combination with heating apparatus of the kind which includes a supply pipe for the heating medium, and a return pipe therefor, of air cooling apparatus, means to deliver air from said cooling apparatus into the supply pipe of the heating apparatus, an air delivery outlet from said supply pipe constructed and arranged to permit the free discharge of air therefrom, and means to cut off communication between said supply pipe and the heating connections, and between said supply pipe and the air connections, whereby either the air cooling and delivering apparatus or the heating apparatus may be used to the exclusion of the other, in combination with a common supply pipe.

19. The combination with heating apparatus of the kind which includes a supply pipe for the heating medium, of air cooling apparatus, means to deliver air from said cooling apparatus into the supply pipe of the heating apparatus, and an air delivery outlet from said supply pipe constructed and arranged to discharge the cooled air freely into the upper port of the apartment to be cooled, and means to cut off communication between said supply pipe and the heating connections, and between said supply pipe and the air connections, whereby either the air cooling and delivering apparatus or the heating apparatus may be used to the exclusion of the other, in combination with a common supply pipe.

Signed by us at Newport, N. H., this tenth day of September 1919.

CHARLES LEON ROGERS.
MANLY CHAPMAN ROGERS.
WILLARD W. BROWN.